(12) United States Patent  (10) Patent No.: US 7,445,180 B2
Plude et al.  (45) Date of Patent: Nov. 4, 2008

(54) ACTUATION SYSTEM FOR TAIL SECTION OF AIRCRAFT

(75) Inventors: Leo W. Plude, Woodinville, WA (US); Malcolm S. Bryant, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 11/541,849

(22) Filed: Oct. 2, 2006

(65) Prior Publication Data

US 2008/0099612 A1   May 1, 2008

(51) Int. Cl.
*B64C 1/20* (2006.01)
(52) U.S. Cl. .................. 244/118.1; 244/118.2; 244/120; 244/129.4; 244/137.1; 244/99.1
(58) Field of Classification Search ............... 244/118.1, 244/118.2, 120, 129.4, 137.1, 99.1
See application file for complete search history.

(56) References Cited

U.S. PATENT DOCUMENTS

| 3,055,620 | A | * | 9/1962 | Weiland ................. 244/135 A |
| 4,395,000 | A | | 7/1983 | Deviny et al. |
| 4,593,871 | A | | 6/1986 | Nichols |
| 4,621,780 | A | | 11/1986 | Doyhamboure et al. |
| 4,680,891 | A | | 7/1987 | Perkins |
| 5,427,329 | A | * | 6/1995 | Renzelmann et al. ......... 244/49 |

* cited by examiner

*Primary Examiner*—J. Woodrow Eldred
(74) *Attorney, Agent, or Firm*—Dykema Gossett LLP

(57) ABSTRACT

The invention is directed to an actuation system in an aircraft comprising a fuselage and a hinged tail section with at least one interlock component that engages a tail support, wherein the engagement of the tail support to the tail section enables the actuation system to operate. The actuation system pulls in, latches, and locks the tail section during closing of the tail section, and the actuation system unlocks, unlatches, and releases the tail section during opening of the tail section.

19 Claims, 13 Drawing Sheets

FIG. 2A
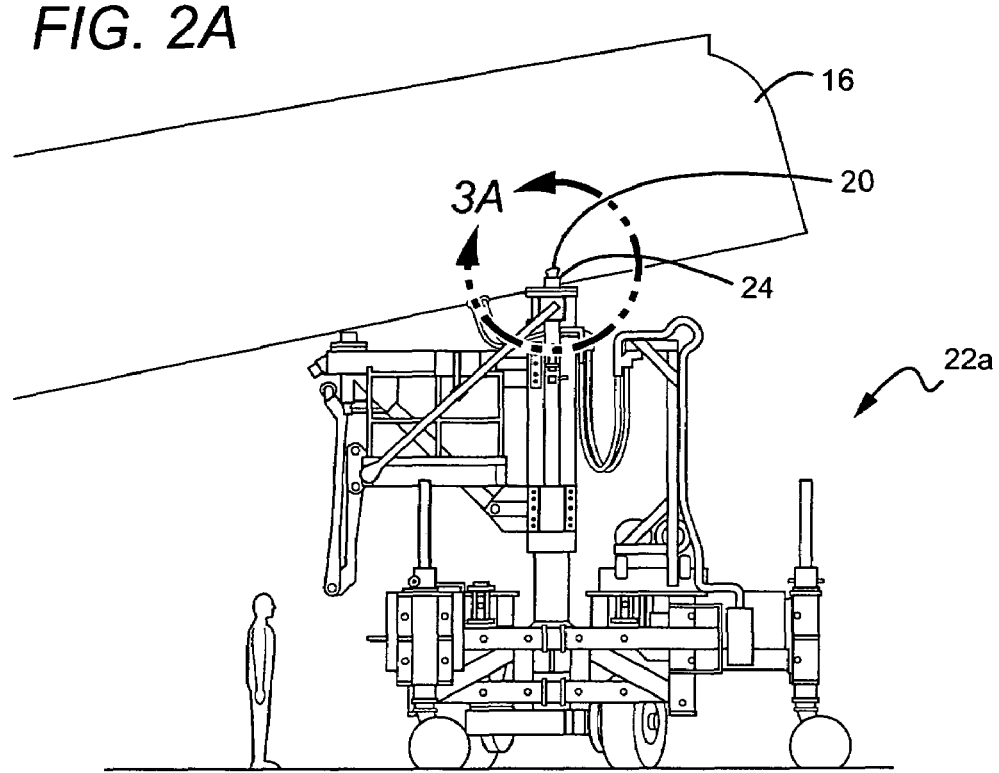
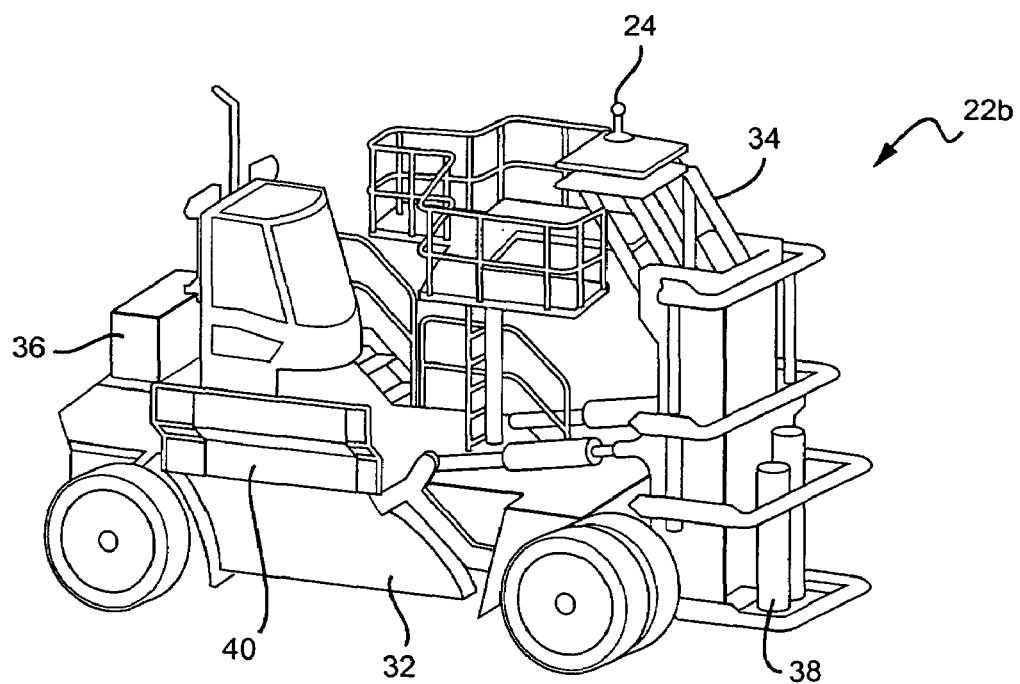
FIG. 2B

FIG. 3B
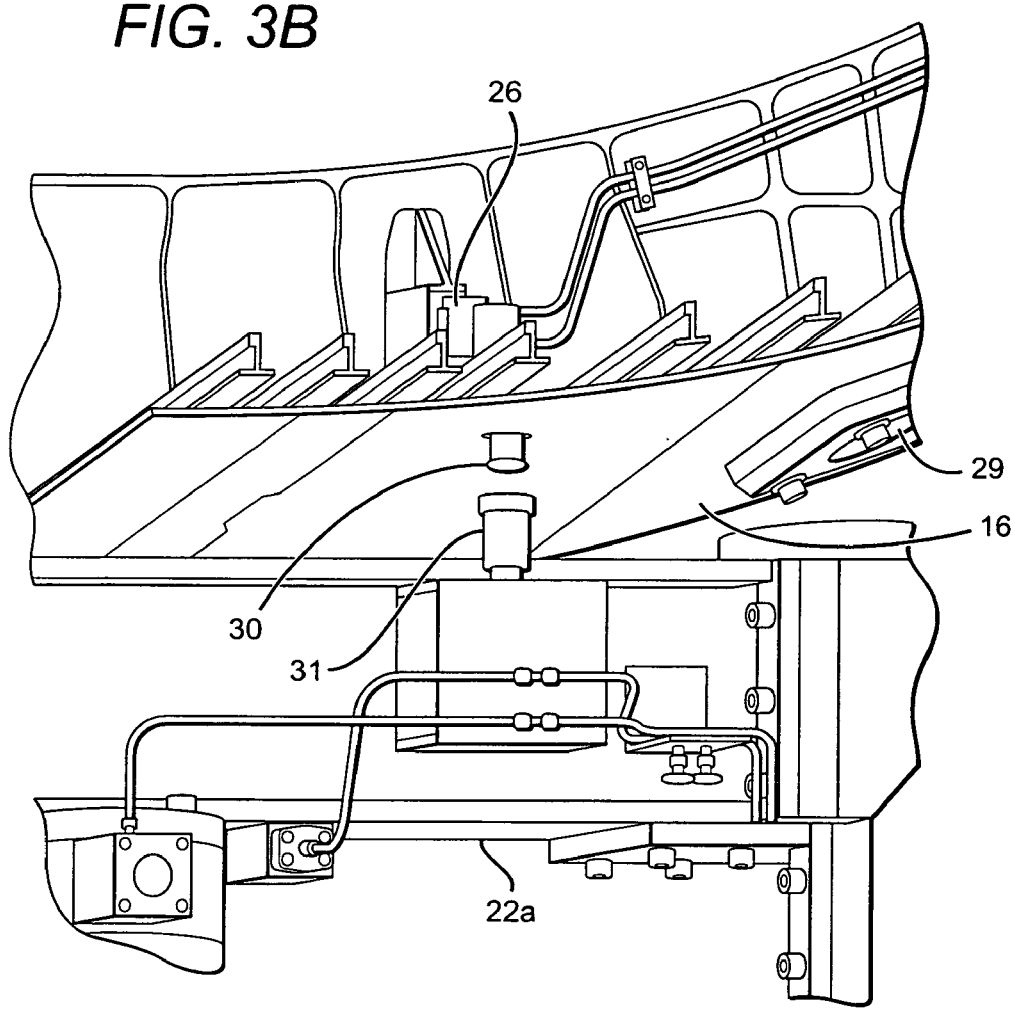
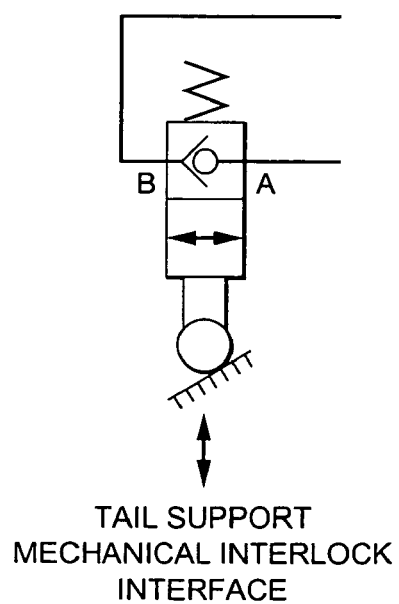
FIG. 19
TAIL SUPPORT
MECHANICAL INTERLOCK
INTERFACE

ACTUATION SYSTEM FOR TAIL SECTION OF AIRCRAFT

BACKGROUND OF THE INVENTION

1) Field of the Invention

The invention relates to an actuation system for use with aircraft. More particularly, the invention relates to an actuation system for pulling in, latching, and locking, and unlocking, unlatching, and releasing the tail section of large cargo transport aircraft.

2) Description of Related Art

Aircraft fuselage, wing parts, and other aircraft cargo are often transported from one location to another via boat, railroad, or other aircraft. Boat and railroad transport often takes much longer and is more expensive than aircraft transport, and thus, aircraft transport is the preferred mode of transportation. Large cargo transport aircraft may be used to transport aircraft fuselage sections, wing parts, and other cargo to and from various locations. Certain cargo transport aircraft include a tail section located in the aft portion of the aircraft that may be opened and closed with various known systems to allow access to the aircraft for loading and unloading of cargo. One such known system includes a tail section that uses a caster-type strut to support the movable fuselage section. However, vertically hinged tail fuselage sections supported by a caster-type strut may have problems opening and closing under windy conditions. Under windy conditions the loads required to open or close the tail section are large, and such struts provide minimal ability to hold the tail section open and have limited or no braking capability. Another known system includes totally disconnecting the tail section from the fuselage and putting it on a cart while the aircraft is being loaded or unloaded. However, this system is time consuming and requires special equipment to hold the tail section while the aircraft is being loaded or unloaded. Another known system includes means to latch and lock the tail section where the latches are arranged in such a way that the forces caused by in-flight deflections can cause unlatching. Such unexpected unlatching can cause catastrophic accidents during flight. Moreover, for aircraft such as the 747LCF, when the aircraft is not in flight and on the ground, such unexpected unlatching can cause the tail section to over-rotate, fracture the hinge fittings, and separate from the main fuselage damaging the tail section and wing beyond repair.

Accordingly, there is a need for an improved actuation system for pulling in, latching, and locking, and unlocking, unlatching, and releasing the tail section of large cargo transport aircraft that does not have the problems associated with known methods and devices.

SUMMARY OF THE INVENTION

The invention satisfies this need for an improved actuation system for pulling in, latching, and locking, and unlocking, unlatching, and releasing the tail section of large cargo transport aircraft that does not have the problems associated with known systems, as well as provides a unique, nonobvious, and advantageous system. None of the known systems provides all of the numerous advantages of the invention. Unlike known systems, the actuation system for pulling in, latching, and locking, and unlocking, unlatching, and releasing the tail section of large cargo transport aircraft provides the following advantages: provides a means to pull in, latch, and lock, and unlock, unlatch, and release a tail section of a cargo transport aircraft to enable efficient transport of aircraft fuselage and wing sections and other cargo to and from various locations in the world; provides a system that minimizes the turn time of the tail section; provides a system that significantly reduces the cost of transport by air as compared to the cost associated with water and rail transportation; provides a system that is compliant with the current Federal Aviation Administration (FAA) regulations concerning aircraft designs; provides a means to pull-in, latch, lock, unlock, unlatch, and release a very large vertically hinged tail section of an aircraft that is vertically supported, powered open and closed, and restrained against wind loads by a tail support attached to the tail section; provides a system that incorporates a manual backup means if normal electrical power is not available; provides a system where the means to pull in, latch, and lock, and unlock, unlatch, and the tail section are capable of operating in windy conditions, so as not to impact turnaround times and flight schedules; provides a system with a means to prevent unlocking, unlatching, and release of the tail section until the tail support is both attached to the tail section and is properly pressurized; provides a system that has an arrangement of latch pin actuators such that the forces cause by in-flight deflections do not tend to cause unlatching; and provides a system that uses a tail support that communicates with the pull-in, latching and locking functions so that the tail support unloads the majority of deflection loads during operation, and the forces the pull-in and latch pin actuators must generate are greatly reduced and the aircraft structure can be optimized to reduce weight.

In one aspect, the invention provides for an actuation system in an aircraft comprising a fuselage and a hinged tail section with at least one interlock component that engages a tail support, wherein the engagement of the tail support to the tail section enables the actuation system to operate. Preferably, the actuation system pulls in, latches, and locks the tail section during closing of the tail section, and the actuation system unlocks, unlatches, and releases the tail section during opening of the tail section. Preferably, the tail section incorporates a plurality of latch pin actuators in a radial arrangement around an unhinged portion of the tail section. In one version of this aspect of the invention, the tail support has three attachment components, such that at least one of the three attachment components is attached to the tail section when the system is in operation. In another version of this aspect of the invention, the tail support has one attachment component for attachment to the tail section when the system is in operation.

The invention further provides for a method of enabling a latch/lock actuation system of a hinged tail section of an aircraft, wherein the method comprises the steps of: positioning a tail support near the hinged tail section; and, connecting the tail support to the tail section in such a manner as to enable the latch/lock actuation system. Preferably, the actuation system of the method pulls in, latches, and locks the tail section during closing of the tail section, and the actuation system unlocks, unlatches, and releases the tail section during opening of the tail section. Preferably, the hinged tail section has at least one interlock component that engages the tail support, such that engagement of the tail support to the tail section enables the actuation system to operate.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings which illustrate preferred and exemplary embodiments, but which are not necessarily drawn to scale, wherein:

FIG. 2A is a perspective view illustrating a first version of a tail support attached to the tail section of the aircraft;

FIG. 2B is a perspective view illustrating a second version of a tail support that may be used in the invention;

FIG. 3B is a rear view of the interlock component and tail support interface;

DETAILED DESCRIPTION OF THE INVENTION

The invention now will be described more fully hereinafter with reference to the accompanying drawings, in which some, but not all embodiments of the invention are shown. Indeed, this invention may be embodied in several different forms and should not be construed as limited to the embodiments set forth herein. Rather, these embodiments are provided so that this disclosure will be thorough and complete and will fully convey the scope of the invention to those skilled in the art. Like numbers refer to like elements throughout.

Figure 1:
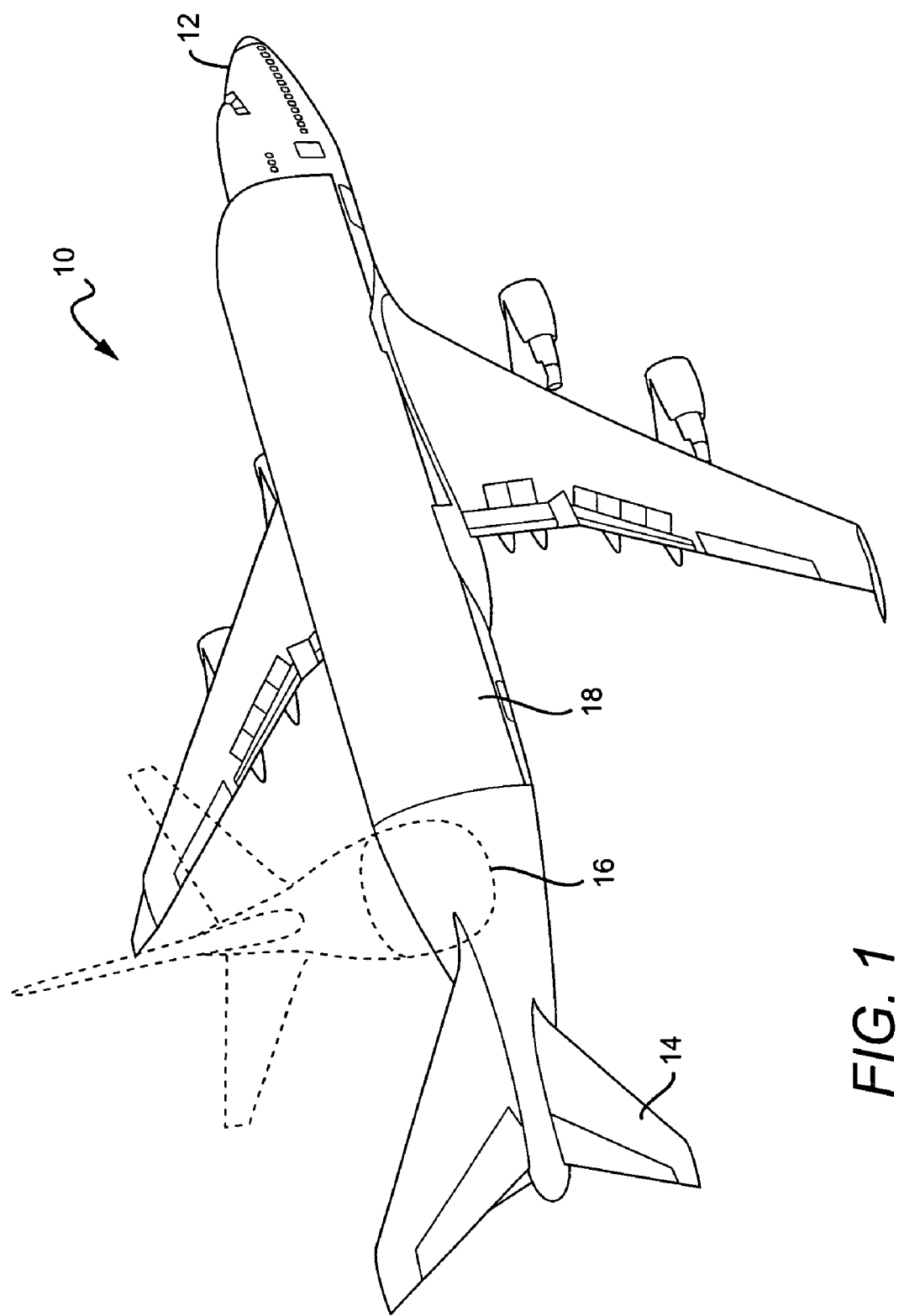
FIG. 1 is a perspective view illustrating a cargo transport aircraft showing in phantom lines a tail section of the aircraft in an open position.
Figure 3A:
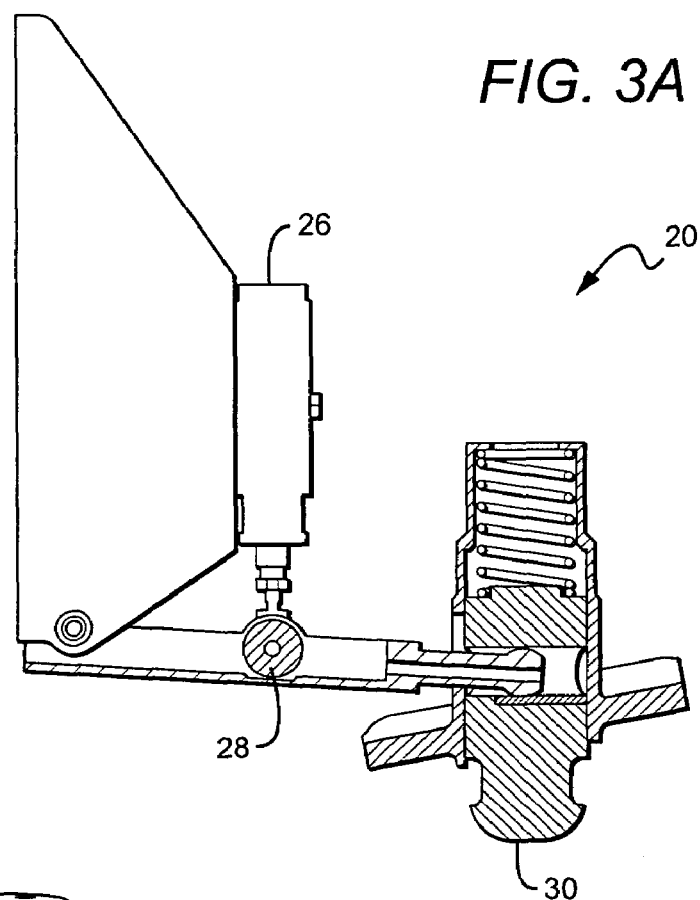
FIG. 3A is an enlarged side view in partial cross-section taken along circle 3 of FIG. 2A illustrating an interlock valve and mechanism configuration that is used with the first version of the tail support in FIG. 2A.

Referring now to the drawings, FIG. 1 shows a perspective view illustrating a cargo transport aircraft 10 having a nose 12 and a tail 14. A vertically hinged tail section 16 of an aircraft and a fuselage portion 18 are shown in phantom lines in an open position. The tail section allows access to the aircraft for loading and unloading of cargo. As shown in FIG. 2A, the tail section incorporates an actuation system comprising at least one interlock component 20 that engages or interfaces with a first version of a powered, tail support 22a to effect operation of the system when the tail support 22a is attached to the tail section 16 of the fuselage portion 18. There may be more than one interlock component located on the tail section. The actuation system pulls in, latches, and locks the tail section during closing of the tail section, and the actuation system unlocks, unlatches, and releases the tail section during opening of the tail section. The tail support is a ground service equipment that provides the power to open and close the tail section, while supporting the weight of the tail section and providing restraint when the tail section is open. The tail support restrains the tail section against wind loads when the tail section is in an open position. In addition, the tail support minimizes fuselage deflections and resultant latching loads. The tail support in FIG. 2A has three attachment components 24, and the three attachment components are engaged with the tail section when the system is in operation. FIG. 3A is an enlarged side view in partial cross-section taken along circle 3A of FIG. 2A illustrating the interlock component 20 having an interlock valve 26, a roller 28, and a plunger linkage 30. The plunger linkage 30 extends outwardly from the interior of the swing. The interlock component may or may not be integrated with an attachment component in the tail support in FIG. 2A. FIG. 3B is a rear view of the interlock component and tail support interface. FIG. 3B shows the tail section 16, tail support 22a, interlock valve 26, and plunger 30, as well as a socket 29, and an actuator 31. The actuator 31 depresses the plunger linkage when the tail support is attached to the tail section. The location of the plunger is fixed relative to the actuator on the tail support 22a by the three attachment components 24. Each attachment component 24 is inserted into a respective socket 29 located on the tail section.

FIG. 2B is a perspective view illustrating a second version of a powered, tail support 22b that is preferably used with the actuation system of the invention. Although tail support 22a is shown in FIG. 3B, tail support 22b may also be use with the interlock component shown in FIG. 3B. With tail support 22a, if a flat plate is attached to the top of the actuator that pushes the plunger, as the tail swings, it will still be in contact with the plunger. The tail support 22b has one attachment component 24 for attaching the tail support to the tail section when the system is in operation. Preferably, the attachment component 24 is in the form of a ball hitch attachment having a 4.4 inch diameter ball fitting that connects to the socket on the tail section. A locking plate (not shown) is preferably installed with a quick release pin to prevent the ball fitting from disengaging from the tail section. The tail support 22b further comprises a lift vehicle chassis 32 for providing the weight and power to perform the tail section opening and closing operations; a tail support system 34; a generator 36 to power the actuation system; accumulator tanks 38 to maintain tail weight with vertical movement during loading and unloading; and controls 40 to interface with the aircraft, provide steering guidance and safety functions. The preferred lift vehicle chassis 32 weighs about 109,000 pounds, and when combined with the tail support system 34, which preferably weighs about 38,000 pounds, such combined weight ensures that the tail support will provide effective restraint against wind loading forces. A 290 horsepower engine provides the motive and hydraulic power for operations. The generator 36 is preferably a 400 hertz 20 KVA (KiloVolt-Amperes (defined as one thousand volt amperes)) electrical generator that provides power to the actuation system. The generator can be started from a panel inside the cab and must remain running when the actuation system is in use. Because the generator is not used for the tail support controls, after the tail section has been opened, the generator can be turned off during cargo loading and unloading operations. The power for the tail support system programmable logic controller (PLC) comes directly from a lift vehicle chassis battery. This ensures that controls will remain on the entire time that the tail support is connected to the tail section, regardless of whether the generator or the lift vehicle chassis motor is turned off. The tail support's accumulator tanks 38 contain hydraulic oil and nitrogen that allow the structure to automatically move vertically in response to the aircraft's motion while maintaining vertical load support. Under normal operation the attachment component 24 ball fitting of the tail support will have an upward force produced by hydraulic pressure in cylinders and the accumulator tanks of the tail support. To ensure that the tail support remains attached to the tail section, a lock plate (not shown) must be engaged so that the ball fitting cannot disengage from the tail section's ball socket. Verification that the lock plate is secured in place is indicated both visually and electronically by sensors.

A tangential compliance of plus or minus four inches is incorporated into the tail support design. Tangential movement along slides requires an operator to manually turn a hand wheel. The tangential compliance is always locked in the manual adjustment mode and will not move from forces applied on the aircraft attachment. Tangential adjustment capability is provided to make fine adjustments to the ball fitting alignment and to relieve tangential loads prior to disengaging from the aircraft. A tangential load cell monitors tangential loads. Its primary function is to monitor wind loads during tail section operation and to protect against exerting excessive force against the fuselage during closing. The load cell also verifies that tangential loads have been eliminated from the ball fitting prior to disengaging from the aircraft. Radial compliance is designed to prevent radial loads from being carried by the tail support and tail section hinges (discussed below). The ball fitting attached to the upper compliance can physically move in the radial direction plus or minus eighteen (18) inches from centerline of the tail support. This provides a range of movement that enables the tail support to be driven on an arc during opening and closing without creating radial loads. Multiple levels of protection are incorporated to prevent radial over travel, such as a linear travel sensor that provides a signal of the radial position to the PLC, as well as and other protections. A radial compliance engagement pin (not shown) provides adjustment control for the radial compliance during initial positioning alignment/installation. The pin is disengaged after the tail support is attached to the tail section to allow free movement of the ball fitting and upper compliance in the radial direction only. A separate transport locking pin (not shown) allows the radial compliance structure to be locked in a centered position during transport of the tail support to and from the airplane.

To operate the actuation system of the invention, the tail support must be mechanically and electrically engaged or connected to the tail section of the aircraft. The tail support supports the tail section when it is open, holds it in position, and provides the motive force for opening and closing the tail section. If the tail section were unlatched and unlocked without the tail support attached, the tail section would swing open uncontrolled, potentially resulting in significant damage to the aircraft. The tail support provides operational power and PLC signal communication to the aircraft tail section. An interlock signal from the tail support to the actuation system prevents the unlocking and unlatching of the tail section unless the tail support is engaged with or attached to the tail section. The interlock component 20 interfaces with the tail support 22a or 22b, such that actuation, preferably hydraulic actuation (both normal and manual backup), cannot be accomplished unless the tail support is attached to the tail section of the fuselage portion, is capable of supporting the fuselage weight, and is capable of restraining the movable section of fuselage against wind loads. The means described herein preferably utilizes a hydraulic means that interfaces and communicates with the tail support that swings the tail section to a position where outsized cargo can be loaded and unloaded.

Figure 5:
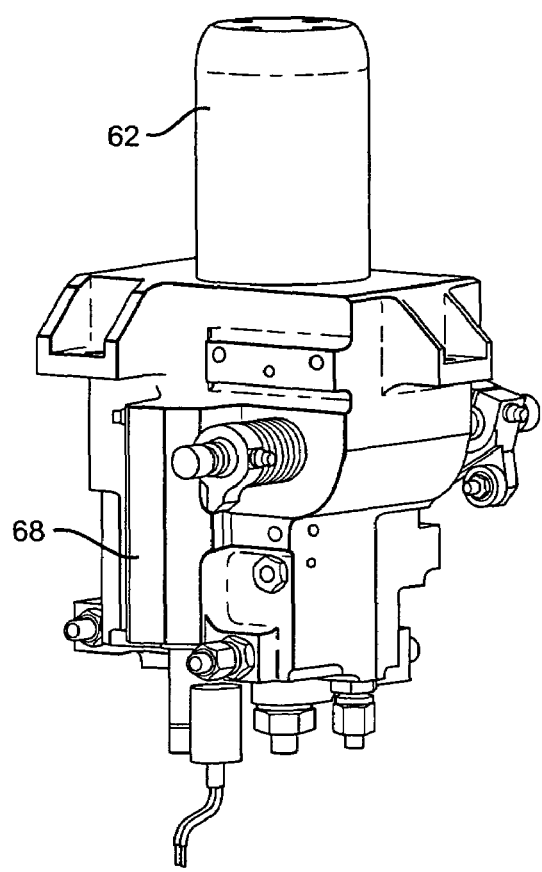
FIG. 5 is a front perspective view of a basic latch pin actuator assembly.
Figure 4:
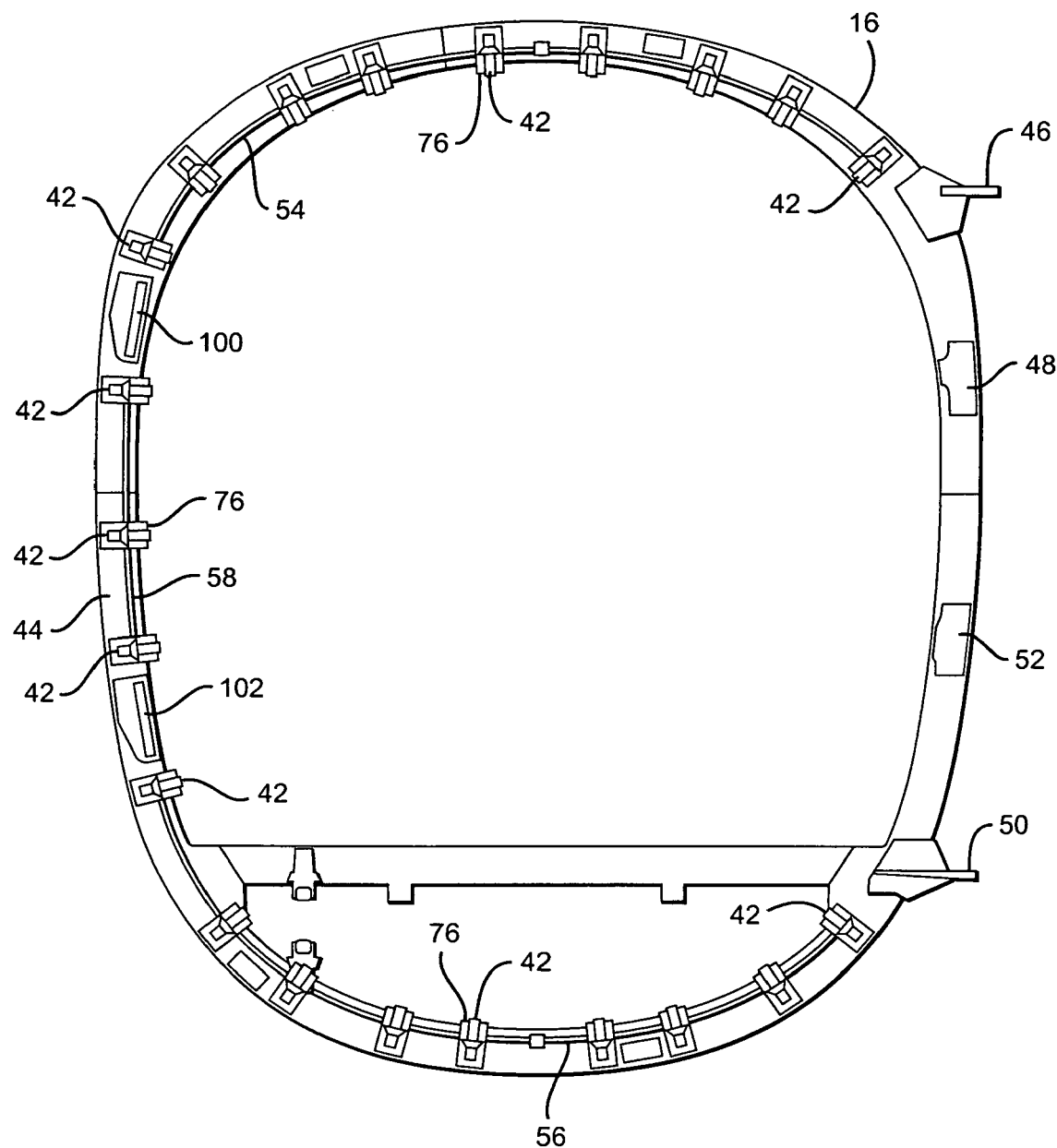
FIG. 4 is a front view illustrating the tail section latching and locking hardware.
Figure 6:
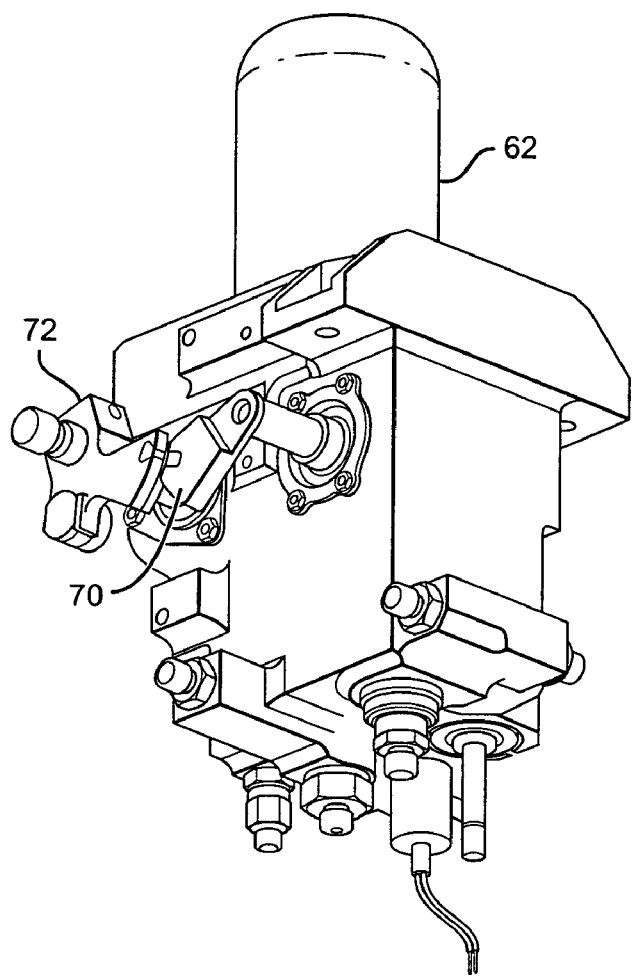
FIG. 6 is a back perspective view of the basic latch pin actuator assembly of FIG. 5.
Figure 7:
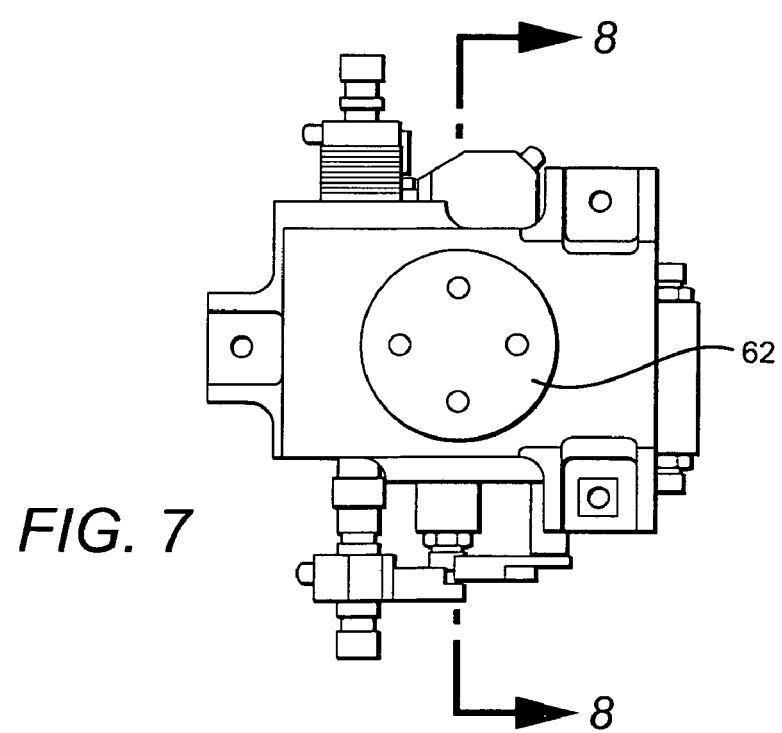
FIG. 7 is top view illustrating a basic latch pin actuator assembly.
Figure 8:
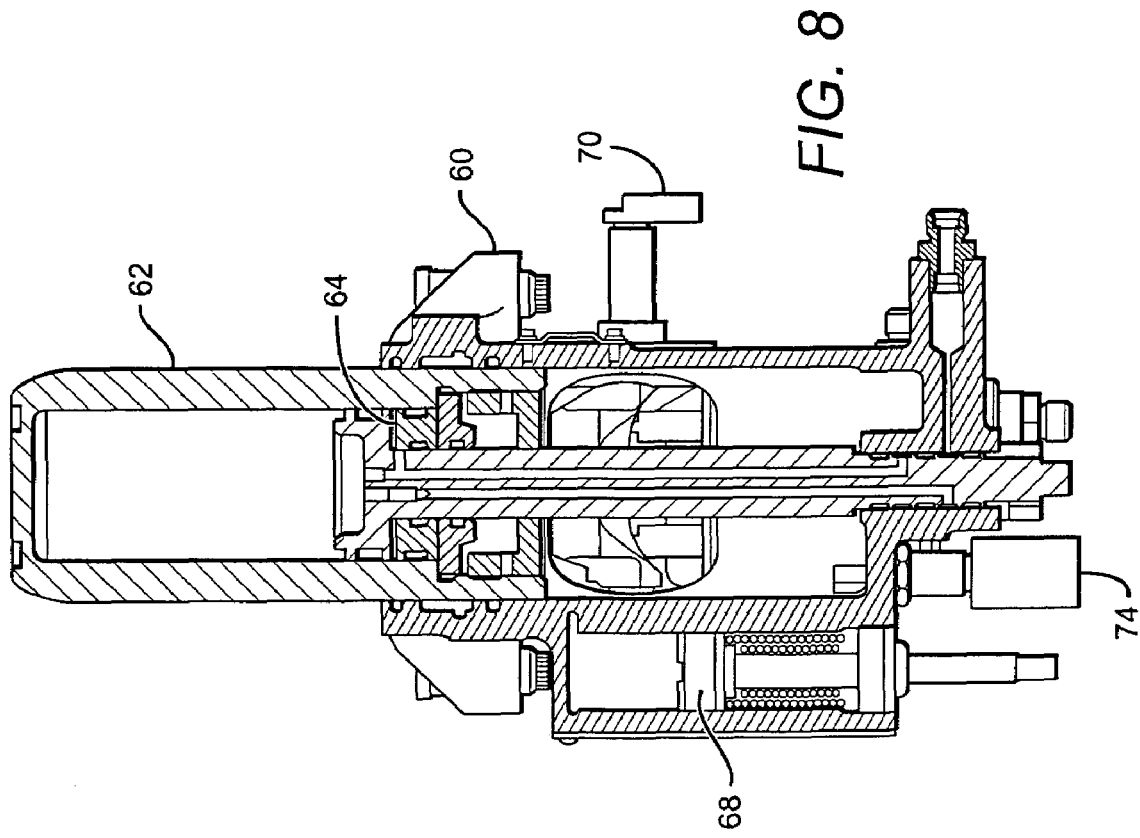
FIG. 8 is a cross-sectional view of the basic latch pin actuator of FIG. 7, taken along lines 8-8.

The actuation system of the invention comprises means for pulling in, latching and locking the tail section during closing of the tail section, and comprises means for unlocking, unlatching and releasing the tail section during opening of the tail section. FIG. 4 is a front view illustrating the tail section latching/unlatching and locking/unlocking hardware. The tail section latching and locking hardware secures the tail section 16 to the fuselage portion 18 when the tail section is closed. The tail section 16 incorporates a plurality of latch pin actuators 42 in a radial arrangement around the periphery of a portion 44 of the tail section. The latch pin actuators are oriented in the radial arrangement in order to isolate the latch pin actuators from unlatching forces due to in-flight deflections. The tail section 16 pivots open on an upper hinge fitting 46, an upper intermediate hinge fitting 48, a lower hinge fitting 50, and a lower intermediate hinge fitting 52. A weather seal (not shown) around the periphery provides environmental sealing between the fuselage portion 18 and the tail section 16. Preferably, the tail section has twenty-one (21) approximately equally spaced latch pin actuators 42 located on the tail section peripherally around the fuselage break, excluding the left side between the upper and lower hinge fittings 46, 50. The latch pin actuators 42 engage interfacing lugs (see FIG. 10—reference number 90) mounted on the fuselage to latch the tail section closed. The latch pin actuators are oriented such that they are normal to the skin of the aircraft to isolate the latch pin actuators from unlatching forces due to in-flight deflections. The latch pin actuators 42 and hinges 46, 48, 50, 52 carry flight and ground loads when the tail section is closed and latched. Hydraulic actuation of the latch pin actuators 42 is prevented or blocked by the interlock component 20 if the support for the hinged section of the fuselage is not attached and supporting the weight of the hinged section of the fuselage. The 21 latch pin actuators 42 are preferably grouped into three (3) lock trains 54, 56, 58. An upper lock train 54 and a lower lock train 56 each contain nine (9) latch pin actuators, and a middle lock train 58 contains three (3) latch pin actuators. Each individual lock train prevents movement of the latch retention means on each latch pin actuator within the individual lock train in the unretained direction. The latch pin actuators are arranged in the plurality of lock trains arranged around approximately three-fourths of the periphery of the unhinged portion of the tail section section. Due to the circumferential length of the fuselage section, the lock train has been subdivided into three (3) sections. One consisting of nine (9) latch pin actuators latching and locking the upper portion of fuselage; three (3) latching and locking the side opposite the hinge; and, nine (9) latch pin actuators latching and locking the lower portion of fuselage. To accommodate this subdivision, and to minimize the number of actuator configurations, preferably four (4) modular versions of the latch pin actuators have been developed—a basic latch pin actuator assembly (FIGS. 5-8); a latch pin actuator/lock power drive unit assembly (FIG. 9-10); a latch pin actuator/ lock switch assembly clockwise (FIG. 11); and, a latch pin actuator/lock switch assembly counterclockwise (FIG. 12). A basic latch pin actuator assembly is shown in FIGS. 5-8. FIG. 5 shows a front perspective view of the basic latch pin actuator assembly, and FIG. 6 shows a back perspective view of the assembly of FIG. 5. FIG. 7 is a top view illustrating a basic latch pin actuator assembly. FIG. 8 is a cross-sectional view of the latch pin actuator of FIG. 7, taken along lines 8-8. The basic latch pin actuator assembly by itself is preferably used in twelve (12) locations on the tail section. The basic latch pin actuator assembly comprises a housing 60, a latch pin 62, a retract chamber 64, a sequence valve (not shown), a grease pump 68, a latch retention mechanism 70, a locking mechanism 72 (see FIG. 14), and an unlatch limit switch 74. The locking and latch retention mechanisms are both spring loaded to the locked and retained positions, respectively. Thus, each latch pin actuator internally incorporates both a latch retention mechanism and a separate, independently actuated locking mechanism to secure the latch pin actuator. The latch retention mechanism in each latch pin actuator isolates the locking mechanism from experiencing unlatching loads. Each lock train comprises a lock drive mechanism that drives the locking mechanism to locked and unlocked positions. A single latch retention mechanism not in the fully latched position prevents locking of the entire lock train in which the latch retention mechanism is contained therein.

Figure 9:
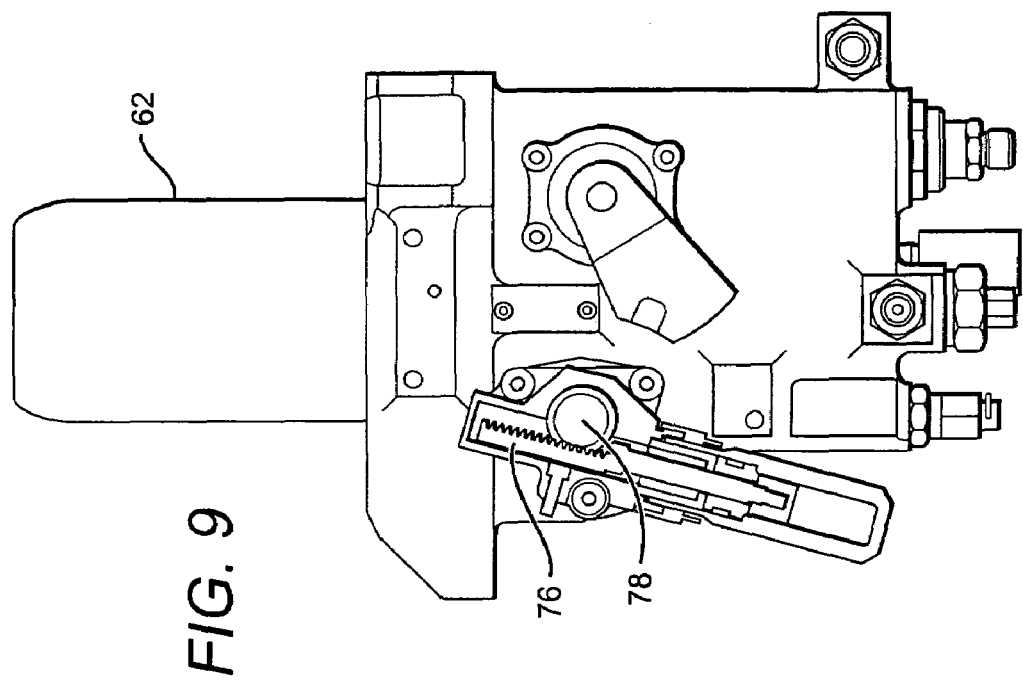
FIG. 9 is an enlarged front view illustrating a latch pin actuator/lock power drive unit (PDU) assembly.
Figure 10:
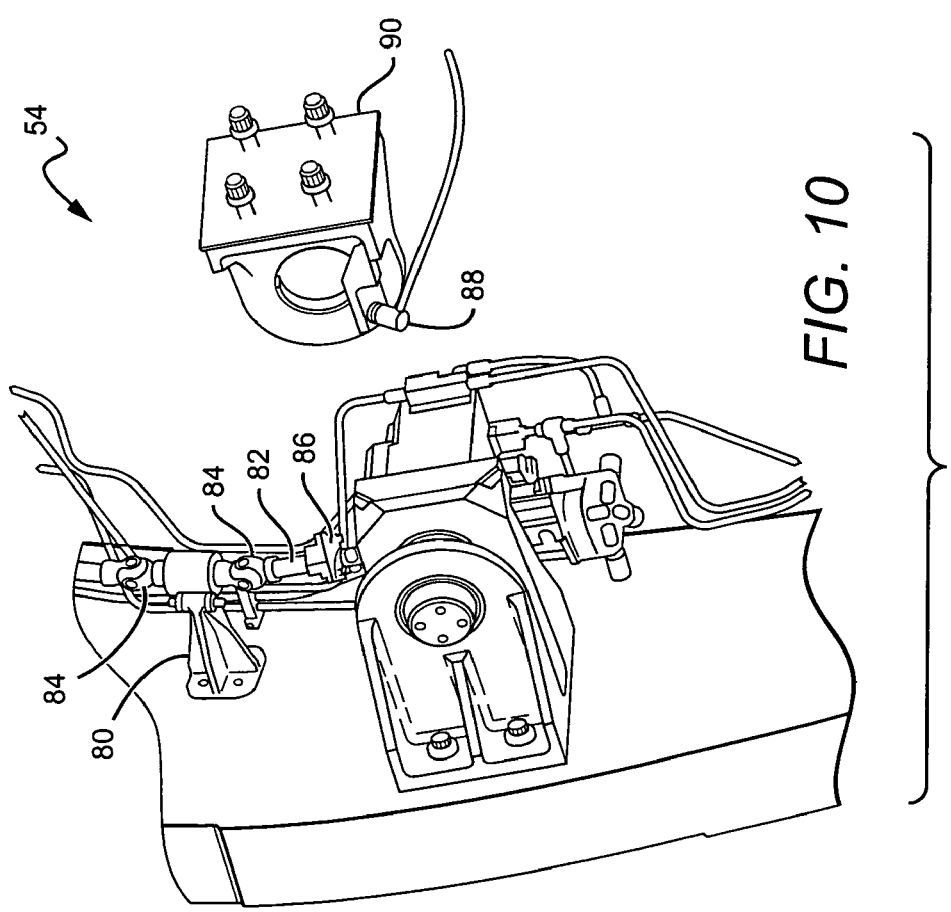
FIG. 10 is an enlarged front elevation view illustrating a lock power drive unit and torque tube portion.

A latch pin actuator/lock power drive unit assembly is shown in FIGS. 9-10. FIG. 9 shows the latch pin actuator 42 with a lock power drive unit 76 and a lock shaft 78. FIG. 10 shows the lock train 54 having a lock train support fitting 80, a torque tube 82, a universal joint 84, a spline joint 86, a closed/latched limit switch 88, and a lug fitting 90 mounted on the fuselage. Preferably, there are three (3) latch pin actuators with an attached lock power drive unit 76 near the center of each lock train. The lock power drive unit 76 is a small actuator mated to a basic latch pin actuator 42 in a latch pin actuator/lock power drive unit assembly. A latch pin actuator/lock power drive unit assembly is mounted at the center of each of the three lock trains 54, 56, 58. Each lock train's drive line consists of a series of torque tubes 82 and universal joints 84 that link the locking mechanisms 72 of the latch pin actuators 42 in the lock train. Thus, each lock train comprises a power drive unit and a plurality of torque tubes and universal joints that interconnect the locking mechanism of each latch pin actuator. Each lock train is prevented from locking until each latch pin actuator within each lock train is latched and the latch retention mechanism in each latch pin actuator is engaged.

Figure 11:
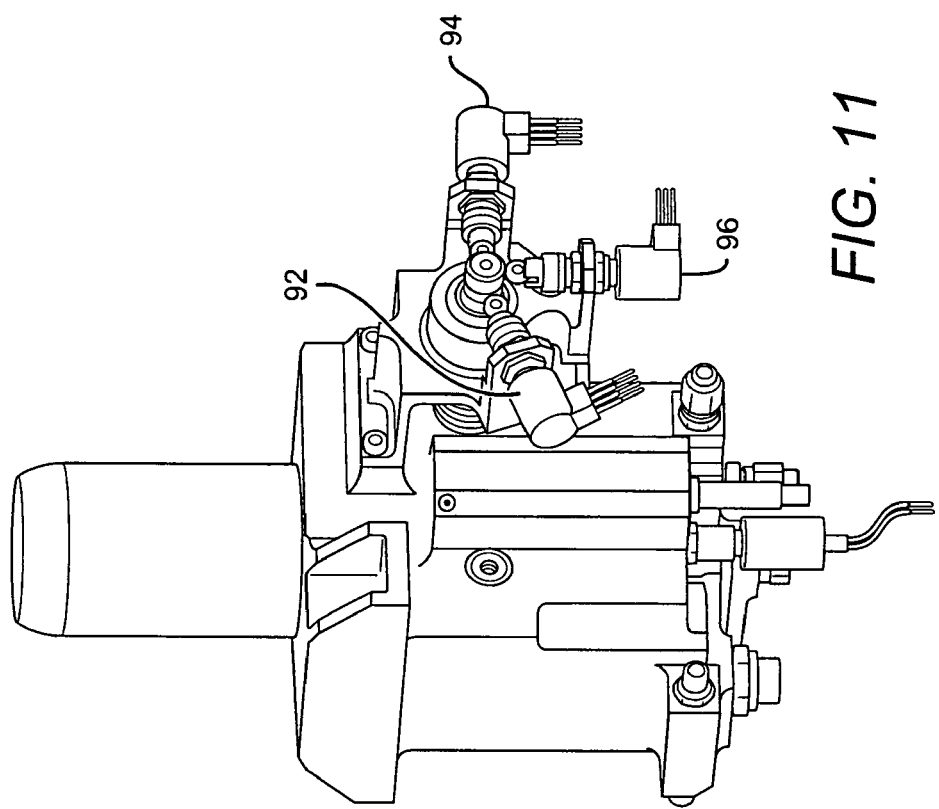
FIG. 11 is an enlarged perspective view illustrating a latch pin actuator/lock switch assembly clockwise.
Figure 12:
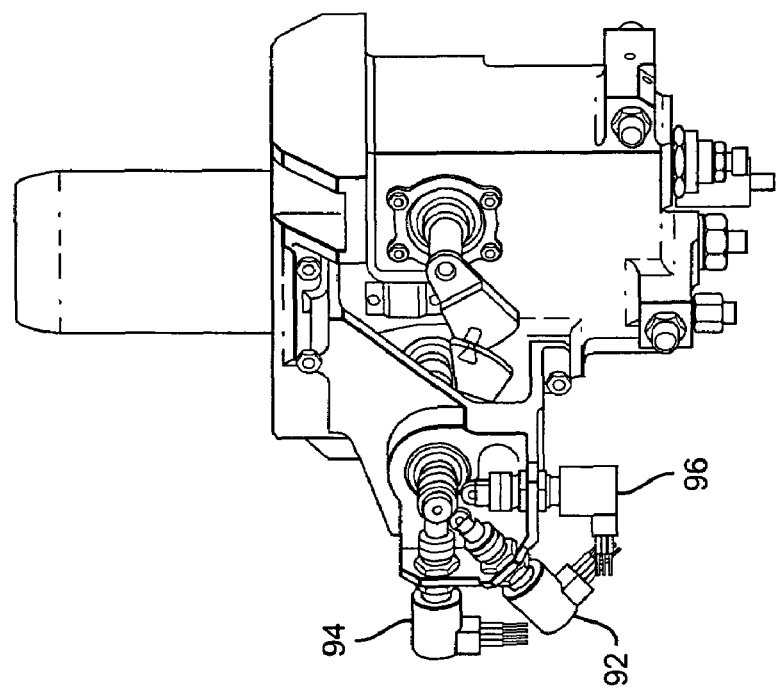
FIG. 12 is an enlarged perspective view illustrating a latch pin actuator/lock switch assembly counterclockwise.

FIG. 11 shows the latch pin actuator/lock switch assembly clockwise. This clockwise view shows an unlock limit switch 92, a first latch/lock limit switch 94, and a second latch/lock limit switch 96. Preferably, there are three (3) latch pin actuators with attached lock switches clockwise located at a first end of each lock train. FIG. 12 shows the latch pin actuator/lock switch assembly counterclockwise. This counterclockwise view shows the unlock limit switch 92, the first latch/lock limit switch 94, and the second latch/lock limit switch 96. Preferably, there are three (3) latch pin actuators with attached lock switches counterclockwise located at a second end of each lock train, opposite the first end.

During the tail section opening, the lock drive system first unlocks the locking mechanism. This rotates the lock shaft out from under the latch pin and rotates the lock shaft sector out of the way. Unlatch pressure is then applied to the unlatch port of the latch pin actuator. This causes the internal sequence valve to rotate the latch retention shaft out from under the latch pin. The sequence valve then ports pressure to the rod end of the latch pin to retract the latch pin. As the latch pin reaches the retracted position, it depresses the grease pump which applies grease to the exterior of the latch pin. The latch pin also depresses the unlatch switch signaling the control and indication system that it is fully unlatched. During latching, pressure is applied simultaneously to the lock and latch ports of the latch pin actuators. This applies pressure to the head end of the latch pin to extend the latch pin. The lock drive system also attempts to rotate the locking mechanism to the locked position. The lock shaft sector however contacts the latch retention shaft sector and stalls out the lock train's lock drive system and prevents the locking shaft from dragging on the latch as it extends. Once the latch is extended, the latch retention shaft is spring loaded to rotate behind the latch pin to prevent back driving of the latch pin. This also rotates the latch retention shaft sector to the retained position and out of the way of the lock shaft sector. This allows the locking shaft to rotate to the locked position. The lock shaft and latch retention shaft sectors sequence this motion so that the locking mechanism cannot lock before the latch retention system is in the retained position. All of the latch pin actuators in the lock train must be fully extended before the lock train can lock.

Figure 13:
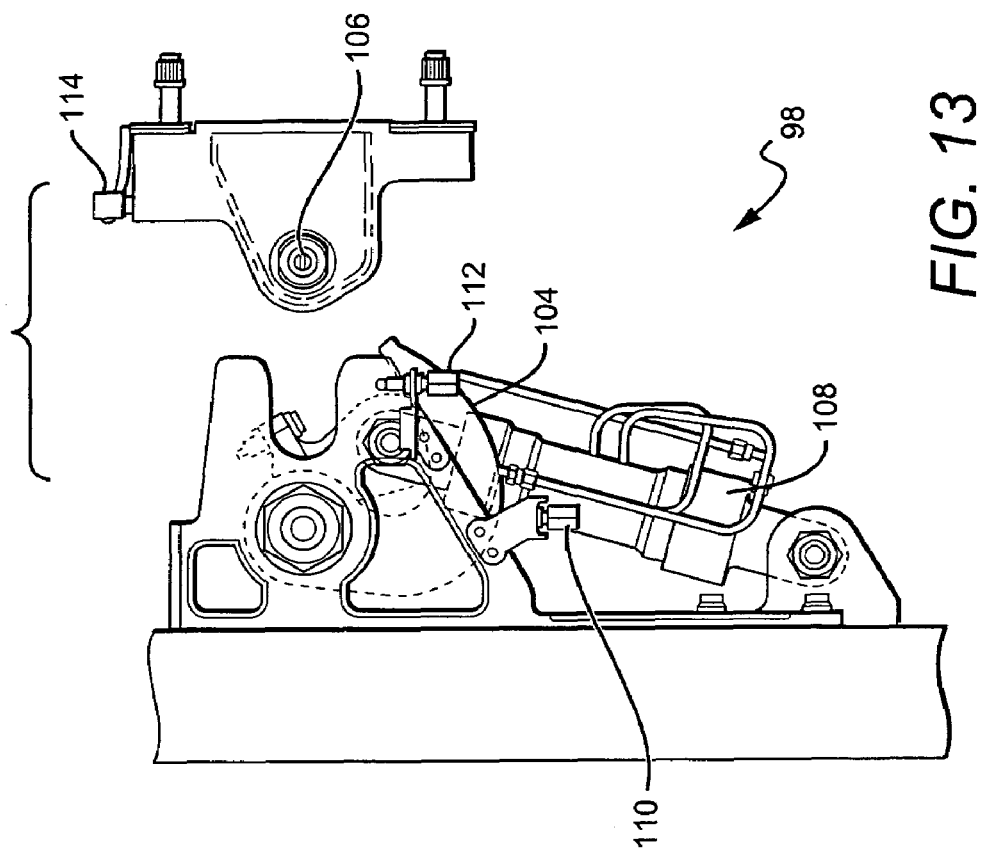
FIG. 13 is an enlarged side view illustrating a pull-in hook actuator and mechanism assembly.

The actuation system of the invention further comprises a means for pulling in the tail section during closing of the tail section and releasing of the tail section during opening of the tail section. FIG. 13 is an enlarged side view illustrating a pull in hook actuator and mechanism assembly 98. The pull in assembly 98 performs the final pull in of the tail section during closing. The pull in assembly 98 pulls in and aligns the tail section to the airplane fuselage or body prior to securing the tail section in place with the latch pin actuators. The pull in assembly 98 includes an upper pull in mechanism 100 and a lower pull in mechanism 102 (see FIG. 4), both mounted on the tail section. As shown in FIG. 13, each pull in mechanism comprises a pull in hook 104, a pull in roller 106, a pull in hydraulic actuator 108, a release switch 110, an in range switch 112, and a pulled in switch 114. The pull in hooks 104 engage rollers mounted on the fuselage. During tail section closing, the pull in mechanisms pull the tail section closed the last 0.3 degrees. As the pull in hooks pull the tail closed, centering guides (not shown) around the periphery of the tail section break engage centering rollers on the fuselage. The centering guides and rollers, in conjunction with the alignment devices integral with the pull in fittings provide the fine adjustment for aligning the latch pins with their respective interfacing lugs prior to latching and locking the tail section. During tail section opening, the pull in mechanisms release the tail section after the latch pins have been unlocked and unlatched. The pull in mechanisms do not provide any push out capability. The pull in hooks do not carry structural loads once the tail section is closed, latched and locked.

Figure 14:
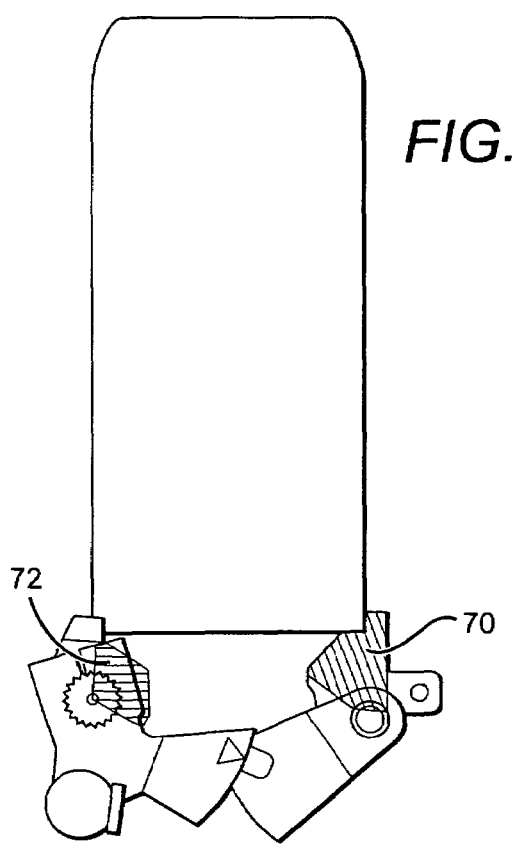
FIG. 14 is a diagram illustrating the latch pin actuator in the latched, retained, and locked position where the lock prevents rotation of the latch retention feature to the unretained position.
Figure 15:
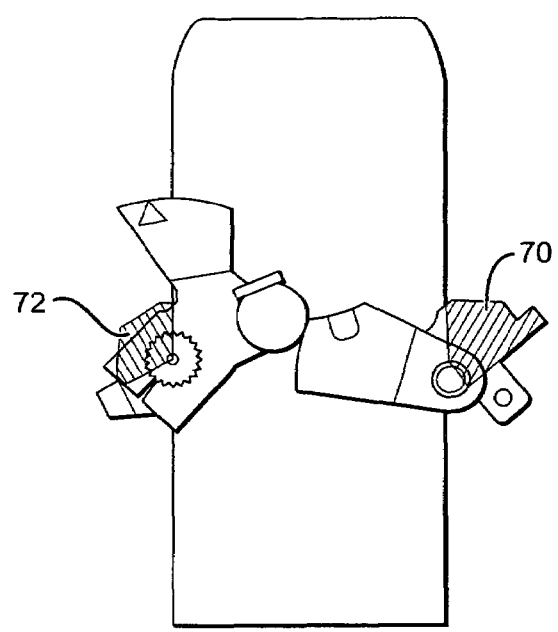
FIG. 15 is a diagram illustrating the latch pin actuator in the unlocked, unretained, and unlatched position where the latch retention means prevents rotation of the locking means to the locked position.

FIG. 14 is a diagram illustrating the latch pin actuator in the latched, retained, and locked position where the lock prevents rotation of the latch retention feature to the unretained position. The latch pin actuator 42 is in a locked position, and the latch retention mechanism 70, the locking mechanism 72, and the lock train 54 are shown. FIG. 15 is a diagram illustrating the latch pin actuator in the unlocked, unretained, and unlatched position where the latch retention means prevents rotation of the locking means to the locked position. The latch pin actuator 42 is in an unlocked position, and the latch retention mechanism 70, the locking mechanism 72, and the lock train 54 are shown.

Figure 16:
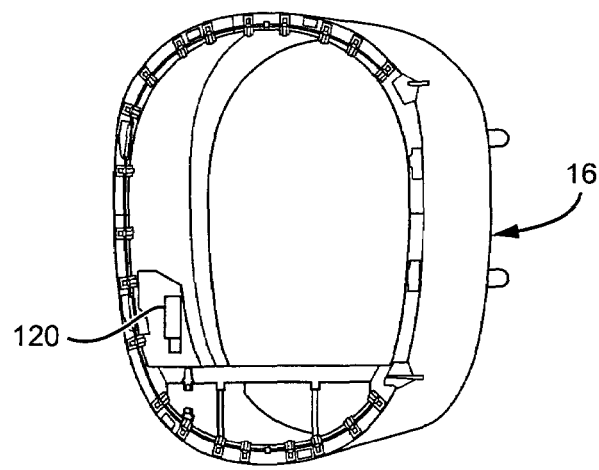
FIG. 16 is a perspective view of the tail section showing the hydraulic power and control assembly (HPCA)
Figure 17:
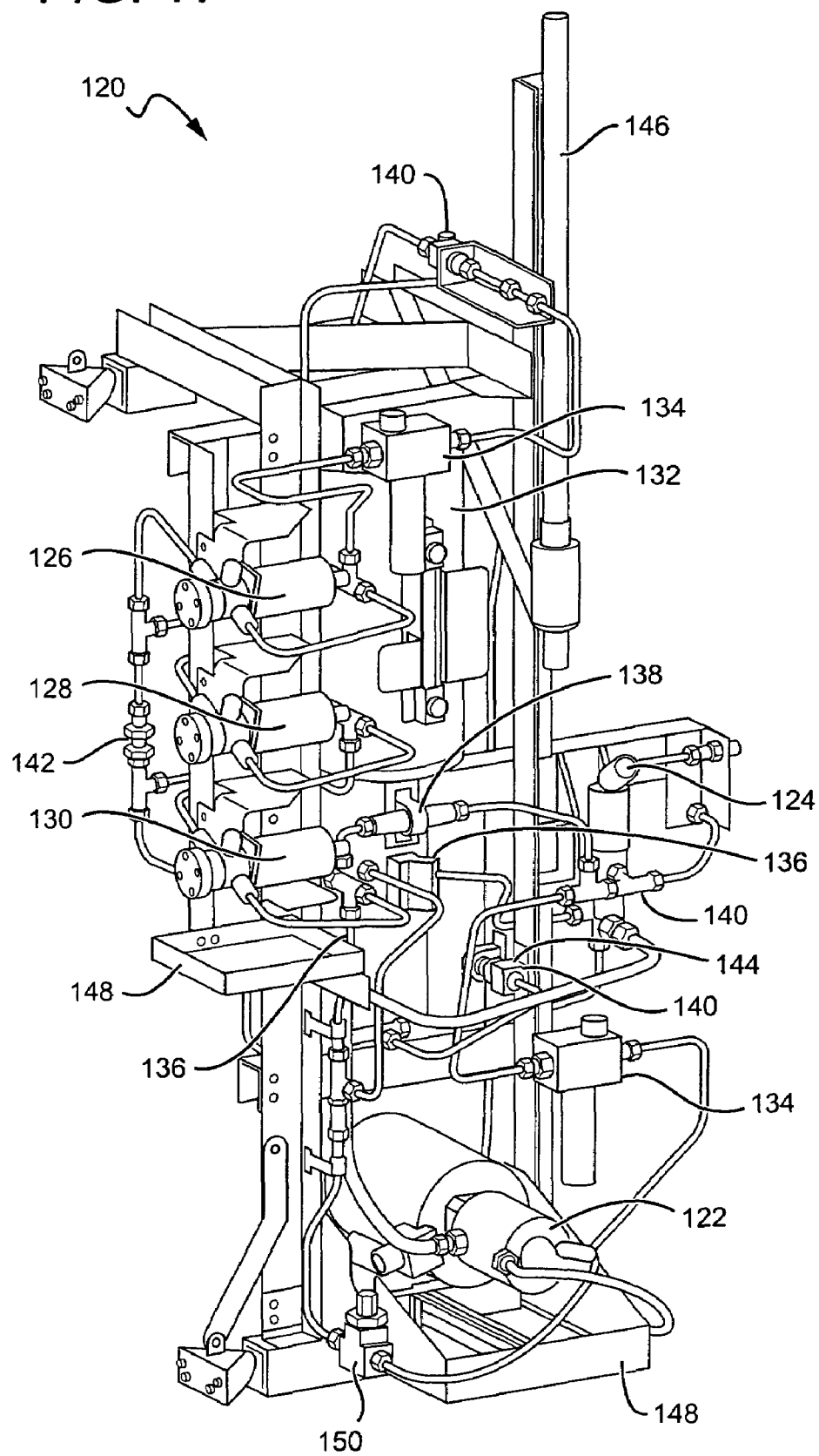
FIG. 17 is an enlarged perspective view illustrating the hydraulic power and control assembly (HPCA)
Figure 18A:
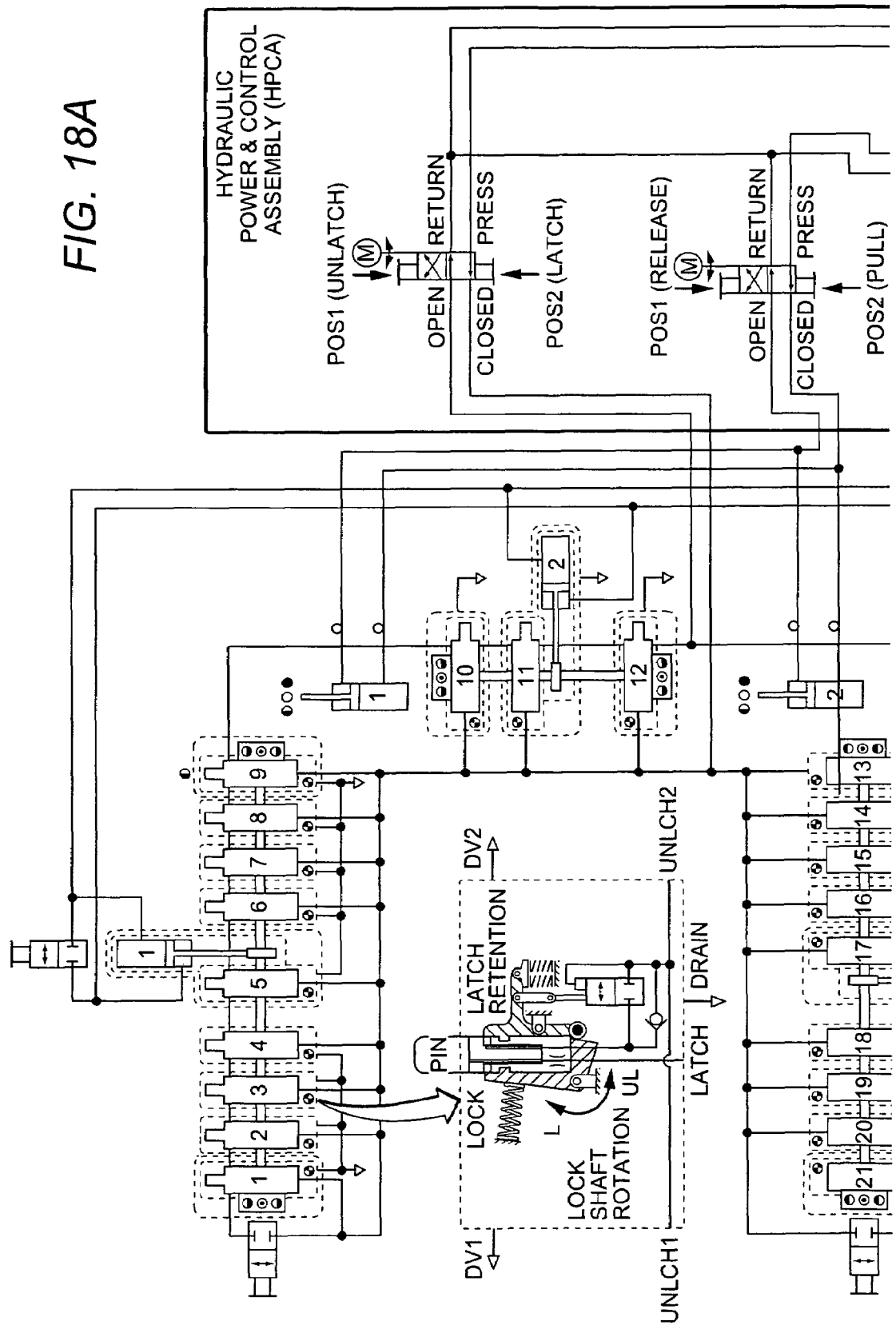
Figure 18B:
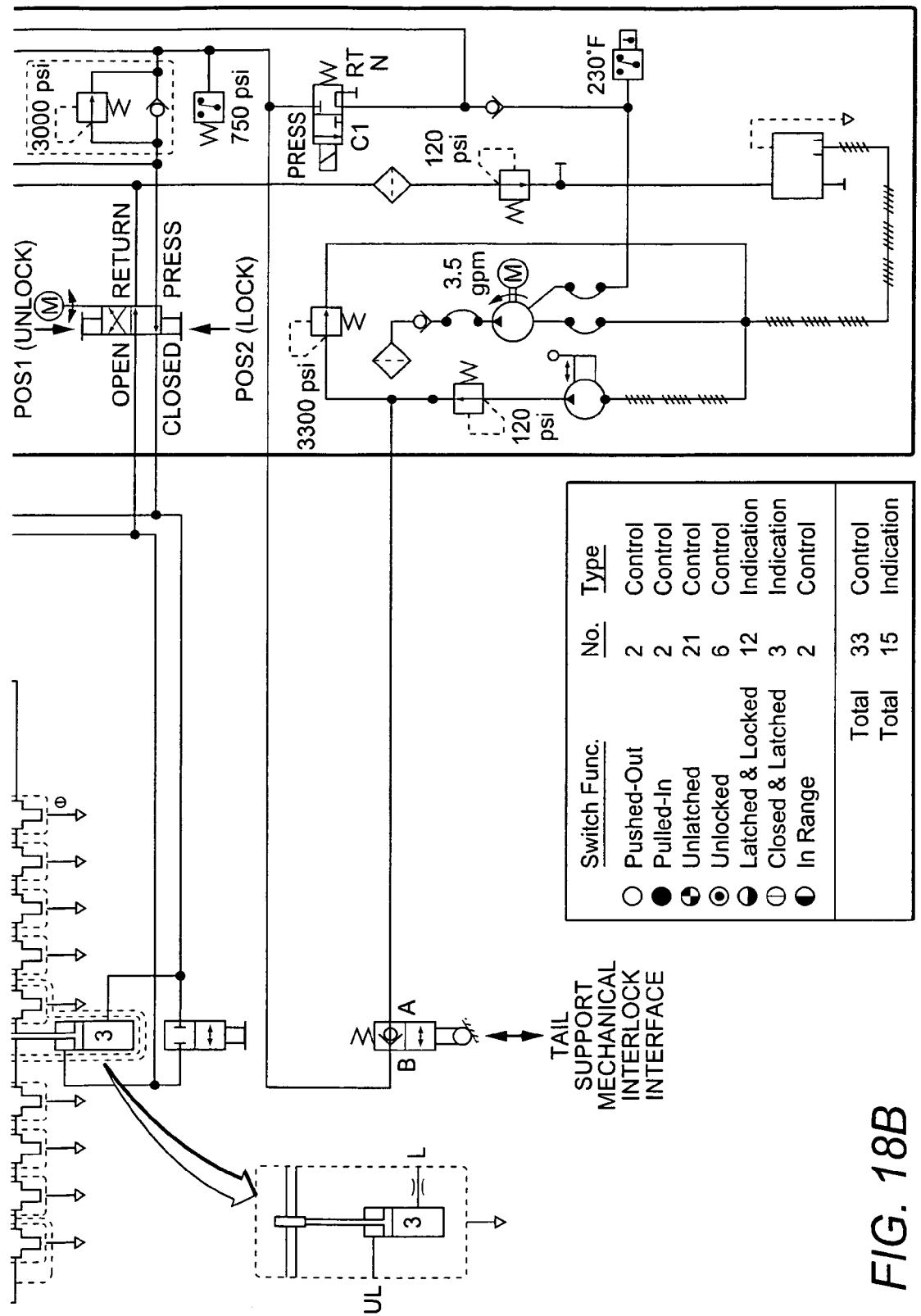

Hydraulic power for the latch pin actuators, the power drive units, and the pull in mechanisms is provided by a dedicated, isolated (from aircraft power and hydraulics) hydraulic power and control assembly (HPCA) 120 located in the tail section. The HPCA is a dedicated, self-contained hydraulic system that provides pressure to the latch pin actuators, power drive units, and pull in mechanisms. FIG. 16 is a perspective view of the tail section 16 showing the hydraulic power and control assembly (HPCA) 120 positioned within the tail section section. FIG. 17 is an enlarged perspective view showing a motor operated valve configuration of the HPCA 120 used during manual operation of the system. The HPCA includes an alternating current motor pump 122, a manual backup pump 124, a lock/unlock motor operated valve 126, a pull in/release motor operated valve 128, a latch/unlatch motor operated valve 130, a hydraulic reservoir 132, filter module 134, a depressurization valve 136, 3300 psi (pounds per square inch) pressure relief valves 138, 120 psi (pounds per square inch) pressure relief valves 140, a 3000 psi (pounds per square inch) relief/check valve 142, a 750 psi (pounds per square inch) pressure switch 144, a manual pump handle 146, drip pans 148, and a 230 degree Fahrenheit thermal switch 150. The low pressure 120 psi pressure relief valves are used to prevent fluid (not shown) from draining back to the hydraulic reservoir so that the actuation system does not need to be bled each flight to remove air in the system. The 3000 psi relief/check valve is used to hold the pull in hooks in the pulled in position, thus retaining the tail section in the closed position, until the latches are commanded to the latched position or if the hydraulic system is depressurized. In addition, the 3000 psi relief/check valve is used to hold the locks in the locked position by a hydraulic block in flight after the hydraulic system is depressurized. An operator can depressurize the door hydraulic system to prevent misting of hydraulic fluid due to failures in flight to minimize the potential for ignition of flammable fluid. The actuation system further comprises a component to control and drain leakage of a hydraulic fluid away from one or more insulation blankets so as to reduce the potential for ignition of the fluid. This component comprises a series of tubes attached to the latch pin housings that direct any fluid leakage in the latch pin housings out of the aircraft. This prevents leakage internal to the latch pin housings from draining out onto aircraft insulation blankets and being absorbed by the insulation blankets. An inherent feature of the latch pin design is that when it leaks, leakage is internally contained. The component to control and drain leakage of the invention allows the plumbing of the latches overboard using conventional aircraft tubing.

Figure 18:
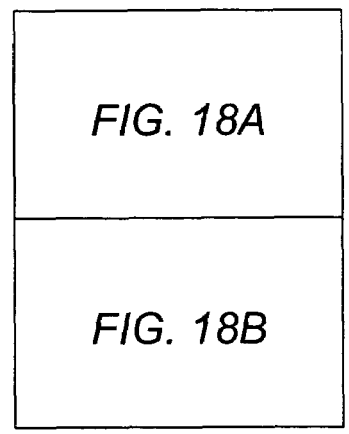
FIG. 18 (includes 18A and 18B) is a schematic drawing of the actuation system of the invention; and, FIG. 19 is an enlarged schematic drawing of the tail support interlock valve portion of the actuation system of the invention.

FIG. 18 (includes 18A and 18B) is a schematic drawing of the actuation system of the invention. The schematic drawing shows the tail section pull in, latch, and lock actuation system. FIG. 19 is an enlarged schematic drawing of the tail support interlock valve portion of the actuation system of the invention. Control of the actuation system is preferably electrical with sequencing and indication provided by hermetically sealed limit switches. Indication of the actuation system status may be provided to an actuation system operator, the flight deck, and a tail support operator. The tail support provides electrical power to the actuation system's alternating current motor pump and motor operated valves and provides an interlock signal to the actuation system to prevent unlatching of the tail section if the tail support is not in place. For the tail support to be enabled, the aircraft air/ground system is in the ground mode and the aircraft power system is energized.

The invention further provides for a method of enabling a latch/lock actuation system of a vertically hinged tail section of an aircraft, wherein the method comprises the steps of: positioning a tail support near the vertically hinged tail section; and, connecting the tail support to the tail section in such a manner as to enable the latch/lock actuation system. In this method, the actuation system pulls in, latches, and locks the tail section during closing of the tail section, and the actuation system unlocks, unlatches, and releases the tail section during opening of the tail section. Thus, the method further comprises steps for the pull in, latch, and lock of the tail section, and the method further comprises steps for the unlock, unlatch, and release of the tail section. The hinged tail section has at least one interlock component that engages the tail support, such that engagement of the tail support to the tail section enables the actuation system to operate. In this method, the tail support is on the ground and supports the weight of the tail section and restrains the tail section against wind loads when the tail section is in an open position.

Under normal operation, the unlock, unlatch, and release steps of the actuation system of the invention includes the following steps: (1) At the latch/lock control and indication panel, the latch/lock operator verifies that the closed, latched, and locked and in range lamps are illuminated. The hydraulic pressure on, unlocked, and unlatch/release lamps should be off. The lamp test switch is operated to verify that all lamps function correctly. (2) To open the tail section, the latch/lock operator must first confirm with the tail support operator that the tail support is properly attached to the airplane and ready to support the tail section. An interlock signal from the tail support to the latch/lock control system prevents powering of the latch/lock control system unless the tail support is locked to the aircraft. (3) Once the tail support operator has confirmed that the tail support is in place, the latch/lock operator starts the opening process by placing the unlock toggle switch in the "unlock" position. This sends a 28 VDC (volts direct current) signal to the tail support to pull in the alternating current motor pump power contactor to provide three phase 115 VAC power to the alternating current motor pump to pressurize the latch/lock system. Simultaneously, the lock/unlock motor operated valve is energized to go to the unlock position to port pressure to the rod end of the lock power drive units (3 places) to drive the three lock trains to the unlock position. When the system pressure is above 750 psi, the pressurized lamp on the control and indication panel will illuminate indicating that the system is pressurized. As soon as any of the latch/lock limit switches (6 places) no longer indicate locked, the closed, latched, locked lamp will go off. When all three of the lock trains are fully unlocked, as indicated by the unlock limit switches (6 places), the unlocked lamp will illuminate. The operator now releases the unlock toggle switch to the "off" position. With the unlock toggle switch in the "off" position, power is removed from the alternating current motor pump. The hydraulic system will trap pressure so the hydraulic pressure on lamp will remain illuminated. (4) The latch/lock operator next places the unlatch/release toggle switch in the "unlatch/release" position. This send a 28 VDC signal to the tail support to pull in the alternating current motor pump power contactor to provide 3 phase 115 VAC power to the alternating current motor pump and a 28 VDC signal to energize the unlatch control relay. When the unlatch control relay is energized, it sends 28 VDC power from the tail support to the latch/unlatch motor operated valve to drive the valve to the unlatch position. A control relay is used due to the large voltage drop resulting from the necessarily long wire run from the control and indication panel to the motor operated valve. This ports pressure to the internal sequencing valve of the latch pin actuators which first causes the latch retention sector to rotate to the unretained position and then ports pressure to the rod end of the latch pin actuators (21 places) to retract. When all 21 latch pins are fully retracted as indicated by the unlatch limit switches, the release control relay is energized. When the release control relay is energized, it sends 28 VDC power from the tail support to the pull in/release motor operated valve to drive the valve to the release position. This ports pressure to the rod end of the pull in actuators (2 places) to retract the pull in hooks and release the tail section. The pull in mechanisms do not provide any push out of the tail section. When both of the released limit switches indicate that their respective pull in hooks are in the released position, the unlatch/release lamp is illuminated. The operator now releases the unlatch/release toggle switch which is spring loaded to the "off" position. With the unlatch/release toggle switch in the "off" position, power is removed from the alternating current motor pump. The system will trap pressure so the pressurized lamp will remain illuminated. (5) The latch/lock operator informs the tail support operator that the tail section is unlocked, unlatched and released and is ready to open. The tail support operator now swings the tail open using the tail support.

Under normal operation, the tail section pull in, latch, and lock steps of the actuation system of the invention includes the following steps: (1) To close the tail section, the tail support operator first confirms with the latch/lock system operator that the unlock/release lamp is illuminated. An interlock signal prevents closing of the tail section unless all 21 latch pins are retracted and the pull in/release hooks are in the released position. The tail support operator may now close the tail section to the in range position as indicated by the in range limit switches (2 places). As the tail section reaches approximately 10 degrees from closed, an alignment ramp on the fuselage engages tail section mounted guide rollers to provide preliminary vertical alignment of the tail section. As the tail section continues to close, six centering rollers (two which are integral with the forward pull in receiver fittings) mounted around the periphery of the fuselage engage centering guides mounted on the tail section. The centering rollers and centering guides provide for fine alignment of the tail section just prior to pull in. Once the tail support operator receives "in range" indication, approximately 0.3 degrees from the fully closed position, the operator stops the tail support and notifies the latch/lock system operator that the tail section is now in range of the pull in hooks. (2) The latch/lock operator may now proceed with pulling in, latching, and locking the tail section. At the latch/lock control and indication panel, the latch/lock operator confirms that the in range lamp is illuminated. The closed, latched, and locked lamp should be off. The hydraulic pressure on the lamp may or may not be illuminated. The latch/lock operator places the pull in, latch, lock toggle switch into the "pull in, latch, and lock" position. This sends a 28 VDC signal to the tail support to pull in the alternating current motor pump power contactor to provide 3 phase 115 VAC power to the alternating current motor pump and a 28 VDC signal to energize the pull in control relay. Prior to being "in range", the pull in, latch and lock system cannot be energized. When the pull in control relay is energized, it sends 28 VDC power from the tail support to the pull in/release motor operated valve to drive the valve to the pull in position. Pressure is ported to the head end of the 2 pull in actuators to drive the 2 pull in hooks to the pulled in position. The pull in hooks engage rollers mounted on the body side of the aircraft to pull the tail section closed. Once the tail section is closed, as indicated by the pull in limit switches (2 places), a 28 VDC signal is sent to the latch/lock control relay. When the latch/lock control relay is energized, it sends 28 VDC power from the tail support to the latch/unlatch and lock/unlock motor operated valves to drive the valves to the latch and lock position, respectively. This ports pressure to the head end of the latch pin actuators (21 places) to extend the latch pins and to the head end of the lock power drive units (3 places) to lock the latch pin actuators in the extended positions. All latch pins on a lock train must be fully extended before the lock train can go to the locked position. Once all 6 of the "A" system latch/lock limit switches (2 switches per lock train) indicated latched and locked, and the 3 closed/latched limit switches (1 per lock train) indicated close and latched, the closed, latched, locked lamp illuminates. The latch/lock operator then releases the pull in lock/latch toggle switch which is spring loaded to the "off" position turning off the alternating current motor pump. (3) The latch/lock operator then moves the depressurize toggle switch to the "depressurize" position. This powers a solenoid operated valve to allow system pressure trapped in the lines to the latch pin actuators to be ported to return. The latch/lock operator must hold the depressurization switch in the "depressurized" position until the system pressurized light goes out. If the operator fails to depressurize, the system pressure remains trapped in the lines to the lock power drive units the pull in actuators. This is however a limited amount of fluid and the trapped pressure eventually bleeds off as fluid leaks past the various actuator seals. (4) The latch/lock operator then informs the tail support operator that the tail section is closed, latched and locked. The tail support operator may now remove the tail support from the airplane.

Thus, the actuation system of the invention is directed to a means to pull-in, latch, and lock, unlock, unlatch, and release a very large vertically hinged tail section of an aircraft that incorporates multiple lock trains arranged around approximately three quarters of the fuselage section; interfaces with a tail support; prevents operation of the actuation means if the tail support is not attached; capable of supporting the weight of the movable vertically hinged tail section section; and incorporates a manual backup means if normal (electrical) power is not available. Since the hinge centerline has a two degree cant, if the tail section were to be unlocked, unlatched, and released, the tail section would act like a pendulum and begin opening. If this were allowed the typically 48,000 pound tail section would over-rotate, fracture the hinge fittings, and separate from the main fuselage damaging the tail section and wing beyond repair. Therefore, the invention provides a means to prevent unlocking, unlatching, and release of the tail section until the tail support is attached to the tail section. The means to latch and lock the tail section have the latches arranged such that the forces caused by in-flight deflections do not tend to cause unlatching. The latch pin actuators are arranged so that the pin axis is normal to the skin (i.e., radial) rather than tangential. In addition to each latch having a lock, each latch also has a latch retention means capable of holding the latch in the latched position independent of the locks. Finally, each lock is not subjected to latching loads.

The actuation system of the invention allows for efficient transport of fuselage and wing sections of large aircraft, as well as other large cargo, to and from various locations in the world by providing a means to open and close the tail section on the aircraft in order to load and unload the fuselage and wing sections and other cargo. An example of a large aircraft that the invention may be used with is aircraft model 747-400 LCF. The invention minimizes turn time by providing a means to pull in, latch, lock, unlock, unlatch, and release a very large vertically hinged section of fuselage. The invention significantly reduces the cost of transport as compared to the cost of transport associated with water and rail transportation. In addition, by using a tail support that communicates with the pull in, latching, and locking functions, such tail support unloads the majority of deflection loads during operation so that the forces the pull in and latching actuators must generate is greatly reduced and the aircraft structure can be optimized to reduce weight.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. An actuation system in an aircraft comprising a fuselage and a hinged tail section with at least one interlock component that engages a tail support, wherein the engagement of the tail support to the tail section enables the actuation system to operate, and further wherein the tail support is on the ground and supports the tail section and restrains the tail section against wind loads when the tail section is in an open position.

2. The system of claim 1 wherein the actuation system pulls in, latches, and locks the tail section during closing of the tail section, and wherein the actuation system unlocks, unlatches, and releases the tail section during opening of the tail section.

3. The system of claim 1 wherein the tail section incorporates a plurality of latch pin actuators in a radial arrangement around an unhinged portion of the tail section.

4. The system of claim 3 wherein the latch pin actuators are oriented in the radial arrangement in order to isolate the latch pin actuators from unlatching forces due to in-flight deflections.

5. The system of claim 3 wherein the latch pin actuators are arranged in a plurality of lock trains arranged around approximately three-fourths of a periphery of an unhinged portion of the tail section, and further wherein each latch pin actuator internally incorporates both a latch retention mechanism and a separate, independently actuated locking mechanism to secure the latch pin actuator.

6. The system of claim 3 wherein the tail section is pulled closed with a pull in mechanism that pulls in and aligns the tail section to the fuselage prior to securing the tail section in place with the latch pin actuators.

7. The system of claim 3 wherein the latch pin actuators are actuated by hydraulic power provided by a hydraulic power and control assembly.

8. The system of claim 1 wherein the tail support minimizes the fuselage deflections and resultant latching loads.

9. The system of claim 1 wherein the tail support has three attachment components, such that at least one of the three attachment components is engaged to the tail section when the system is in operation.

10. The system of claim 1 wherein the tail support has one attachment component for attachment to the tail section when the system is in operation.

11. The system of claim 1 wherein actuation of the system is prevented by the interlock component if the tail support is not engaged with the tail section.

12. An actuation system in an aircraft comprising at least one interlock component that interferes with a tail support having one attachment component, wherein the interlock component effects operation of the system when the tail support attachment component is attached to a hinged tail section of an aircraft, and further wherein the tail support is on the ground and supports the tail section and restrains the tail section against wind loads when the tail section is in an open position.

13. The system of claim 12 wherein the actuation system pulls in, latches, and locks the tail section during closing of the tail section, and the actuation system unlocks, unlatches, and releases the tail section during opening of the tail section.

14. The system of claim 12 wherein the tail section incorporates a plurality of latch pin actuators in a radial arrangement around an unhinged portion of the tail section.

15. The system of claim 14 wherein the latch pin actuators are oriented in the radial arrangement in order to isolate the latch pin actuators from unlatching forces due to in-flight deflections.

16. The system of claim 14 wherein the latch pin actuators are arranged in a plurality of lock trains arranged around approximately three-fourths of a periphery of an unhinged portion of the tail section, and further wherein each latch pin actuator internally incorporates both a latch retention mechanism and a separate, independently actuated locking mechanism to secure the latch pin actuator.

17. A method of enabling a latch/lock actuation system of a hinged tail section of an aircraft, wherein the method comprises the steps of:
    positioning a tail support near the hinged tail section; and,
    connecting the tail support to the tail section in such a manner as to enable the latch/lock actuation system, and wherein the tail support is on the ground and supports the tail section and restrains the tail section against wind loads when the tail section is in an open position.

18. The method of claim 17 wherein the actuation system pulls in, latches, and locks the tail section during closing of the tail section, and wherein the actuation system unlocks, unlatches, and releases the tail section during opening of the tail section.

19. The method of claim 17 wherein the hinged tail section has at least one interlock component that engages the tail support, such that engagement of the tail support to the tail section enables the actuation system to operate.

* * * * *